United States Patent
Chen et al.

(10) Patent No.: US 8,433,115 B2
(45) Date of Patent: Apr. 30, 2013

(54) SYSTEM AND METHOD FOR MULTI-IMAGE BASED STENT VISIBILITY ENHANCEMENT

(75) Inventors: Yunqiang Chen, Plainsboro, NJ (US); Ti-chiun Chang, Princeton Junction, NJ (US); Michelle Xiaohong Yan, Princeton, NJ (US); Tong Fang, Morganville, NJ (US); Thomas Pohl, Marloffstein (DE); Stefan Böhm, Oberasbach (DE); Peter Durlak, Erlangen (DE); Markus Roβmeier, Bamberg (DE)

(73) Assignee: Siemens Aktiengesellschaft, München (DE)

( * ) Notice: Subject to any disclaimer, the term of this patent is extended or adjusted under 35 U.S.C. 154(b) by 403 days.

(21) Appl. No.: 12/846,273

(22) Filed: Jul. 29, 2010

(65) Prior Publication Data

US 2011/0064285 A1 Mar. 17, 2011

Related U.S. Application Data

(60) Provisional application No. 61/243,266, filed on Sep. 17, 2009.

(51) Int. Cl.
*G06K 9/00* (2006.01)

(52) U.S. Cl.
USPC .......................................................... 382/128

(58) Field of Classification Search ............... 382/128
See application file for complete search history.

(56) References Cited

U.S. PATENT DOCUMENTS

| 6,532,380 B1 * | 3/2003 | Close et al. | 600/431 |
| 2005/0270486 A1 * | 12/2005 | Teiwes et al. | 351/209 |

* cited by examiner

*Primary Examiner* — Gerald J. O'Connor
*Assistant Examiner* — Trang Nguyen
(74) *Attorney, Agent, or Firm* — Donald B. Paschburg; F. Chau & Associates, LLC

(57) ABSTRACT

A method for enhancing stent visibility in digital medical images includes providing a time series of 2-dimensional (2D) images of a stent in a vessel, estimating motion of the stent in a subset of images of the time series of images, estimating motion of clutter in the subset of images, where clutter comprises anatomical structures other than the stent, estimating a clutter layer in the subset of images from the estimated clutter motion, estimating a stent layer in the subset of images from the clutter layer and the estimated clutter motion, and minimizing a functional of the estimated stent motion, the estimated stent layer, the estimated clutter motion, and the estimated clutter layer to in calculate a refined stent layer image, where the refined stent layer image has enhanced visibility of the stent.

22 Claims, 4 Drawing Sheets

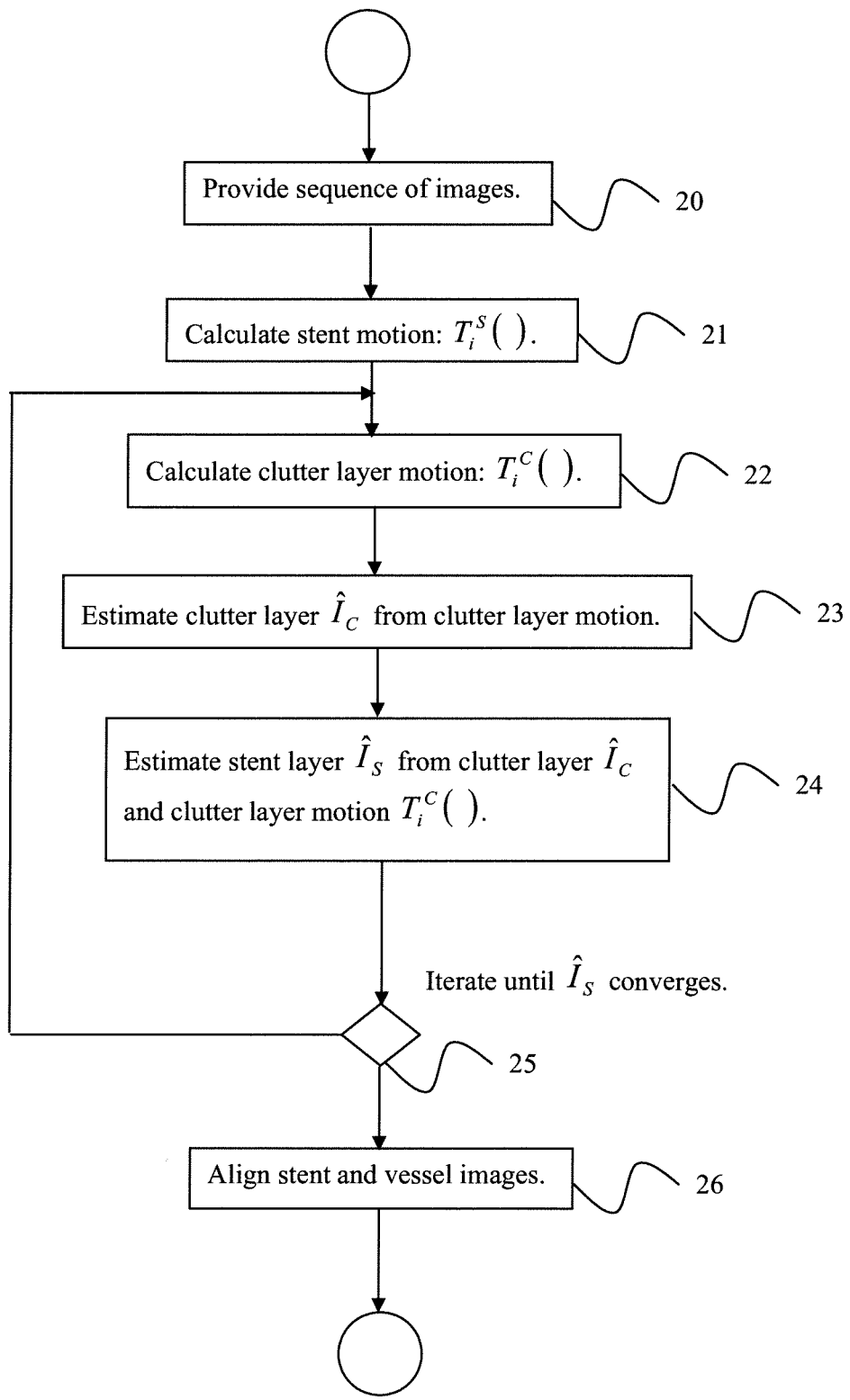

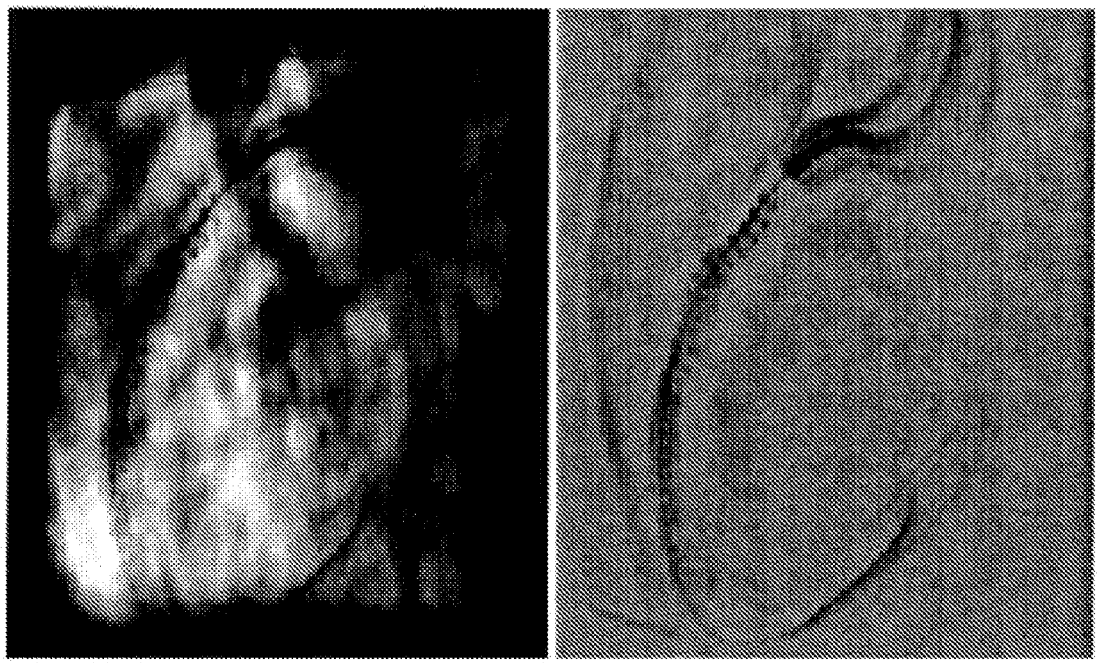
(a)     Fig. 3     (b)
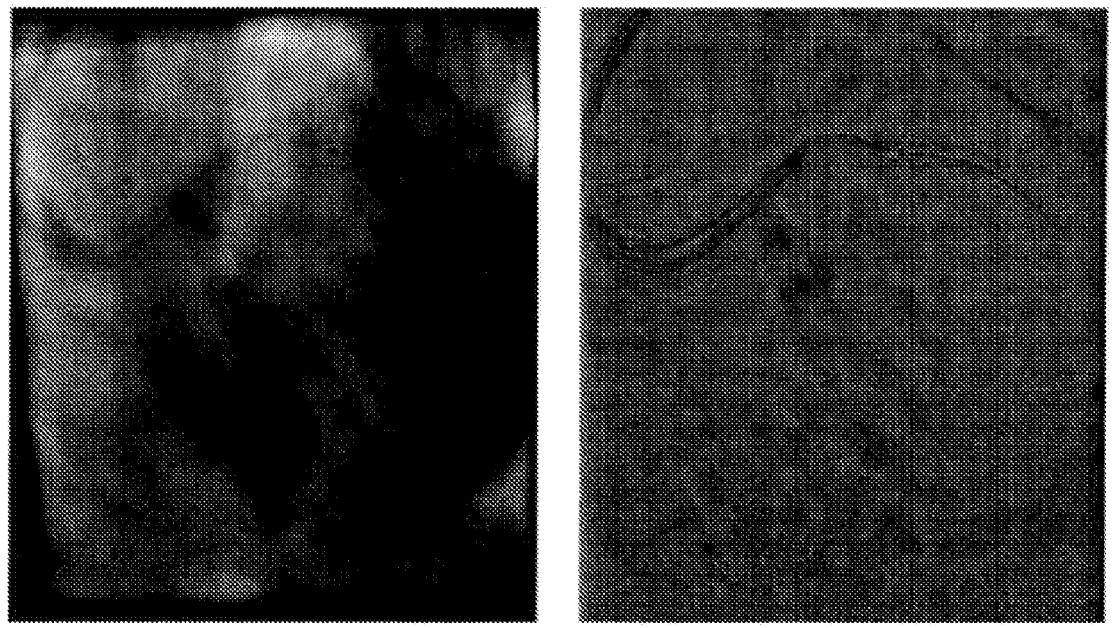
(a)              (b)
Fig. 4

SYSTEM AND METHOD FOR MULTI-IMAGE BASED STENT VISIBILITY ENHANCEMENT

CROSS REFERENCE TO RELATED UNITED STATES APPLICATIONS

This application claims priority from "Multi-image Based Stent Visibility Enhancement", U.S. Provisional Application No. 61/243,266 of Chen, et al., filed Sep. 17, 2009, the contents of which are herein incorporated by reference in their entirety.

TECHNICAL FIELD

This disclosure is directed to enhancing the visibility of stents in digital medical mages.

DISCUSSION OF THE RELATED ART

During a stent placement procedure, a sequence of fluoroscopic X-ray images is usually acquired to check the stent position. Thus, stent visibility in a fluoroscopic image is of great importance in an intervention procedure for accurate stent placement. However, the image's signal to noise ratio is usually very low due to the low-dosage imaging conditions prevalent during the intervention procedures.

Images are typically modeled as additive signal. For X-Ray images, this can be satisfied by applying a log function to image intensity. The log compressed images are usually formulated as follows:

$$I_i = T_i(I_S) + C_i, i \in [1, \ldots, K], \quad (1)$$

where $I_i$ is one of the acquired images, K is the total number of images, $I_S$ is the stent image to be recovered, $T_i$ represents the motion of the stent on each image, and $C_i$ is anything that does not belong to the stent image, which might include unrelated organs or tissue as well as imaging noise. Since the stent is moving during image acquisition, the observed image is a mixture of the deformed stent image (i.e., $T_i(I_S)$) and clutter $C_i$. Traditionally, it is usually assumed that the clutter $C_i$ only includes imaging noise which is zero-mean and independent between observed images. Based on this simplified assumption, the stent image can be recovered by an align-and average method, i.e., aligning all the images and averaging all aligned frames:

$$\hat{I}_S = \frac{1}{K} \sum_{i \in [1, K]} T_i^{-1}(I_i).$$

However, the previous assumption is over-simplified because the images also include other patient organs and vessels which do not belong to the stent image. These structures are usually not independent between images. The organs are deformed and overlaid onto the whole series of images. A more accurate imaging model hence should explicitly model the clutter layer and its motion, which can be formulated as follows:

$$I_i = T_i^S(I_S) + T_i^C(I_C) + N_i, i \in [1, \ldots, K] \quad (2)$$

where $I_C$ is the clutter layer, $T_i^C()$ is the motion of the clutter layer and $N_i$ is an independent zero-mean imaging noise.

This new model requires a different method to solve other than the usual align-and-average. Traditional averaging can only provide a result that s a mixture of the true stent image and a motion blurred clutter layer.

By explicitly modeling the clutter layer and its motion, one can separate the motion blurred clutter layer and the stent image, hence significantly enhancing the visibility of the stent.

SUMMARY OF THE INVENTION

Exemplary embodiments of the invention as described herein generally include methods and systems for enhancing stent visibility based on multiple input images during an invention procedure. The input to an algorithm according to an embodiment of the invention is a series of images acquired of a stent to which a pair of balloon markers are attached. The output is an enhanced stent image based on the acquired series. A stent visibility enhancement according to an embodiment of the invention is performed in a batch processing mode, in that a whole image sequence is captured first, then the enhancement is applied based on the whole sequence to generate one enhanced image of the stent. A method of enhancing stent visibility in a digitized image according to an embodiment of the invention, including the input and output, is as follows, as shown in FIG. 1: (step 11) detect the location of the balloon marker pair; (step 12) estimate stent motion based on the detected balloon markers; (step 13) pre-process all acquired image frames so that the images satisfy the algorithm requirements, including intensity remapping, so that the images satisfy the additive model, and lighting compensation; (step 14) based on the multiple images, decompose the image into a stent layer and a clutter layer; and (step 15) align the stent and vessel images for better inspection of the stent placement. Details of these steps are provided below.

According to an aspect of the invention, there is provided a method for enhancing stent visibility in digital medical images, including providing a time series of 2-dimensional (2D) images of a stent in a vessel, estimating motion of the stent in a subset of images of the time series of images, estimating motion of clutter in the subset of images, where clutter comprises anatomical structures other than the stent, estimating a clutter layer in the subset of images from the estimated clutter motion, estimating a stent layer in the subset of images from the clutter layer and the estimated clutter motion, and minimizing a functional of the estimated stent motion, the estimated stent layer, the estimated clutter motion, and the estimated clutter layer to calculate a refined stent layer image, where the refined stent layer image has enhanced visibility of the stent.

According to a further aspect of the invention, the method includes aligning the refined stent layer image with an image of the vessel.

According to a further aspect of the invention, the stent has a pair of balloon markers attached thereto, and further comprising attempting to detect a 2D location of the balloon markers in each of the images, where the subset of images has as members those images in which the balloon marker locations are detectable.

According to a further aspect of the invention, estimating stent motion comprises selecting a first image of the subset of images as a reference image, and for each remaining image in the subset of images, using the 2D balloon marker locations to calculate a 2D translation of a current image with respect to the reference image, a rotation angle from an angle difference of the 2D balloon marker locations in the current image with respect to the reference image, and an axial scaling of the stent in the current image with respect to the reference image, and calculating the stent motion from the translation, rotation, and scaling.

According to a further aspect of the invention, the method includes pre-processing each image in the subset of images to make the image intensities additive, and to compensate for changes in lighting in the ages of the subset of images.

According to a further aspect of the invention, clutter motion is initialized to zero.

According to a further aspect of the invention, wherein minimizing the functional of the estimated stent motion, the estimated stent layer, the estimated clutter motion, and the estimated clutter layer includes repeating the steps of estimating clutter motion, estimating a clutter layer, estimating a stent layer, and minimizing a functional until the refined stent layer image converges.

According to a further aspect of the invention, clutter motion is estimated by subtracting the refined stent layer image from each image in the subset of images to obtain an estimated clutter layer corresponding to each image in the subset of images, and estimating clutter motion from differences in the clutter images.

According to a further aspect of the invention, estimating a clutter layer comprises calculating $$\hat{I}_C = \frac{1}{K} \sum_{i \in [1,K]} (T_i^C)^{-1}(I_i - T_i^S(\hat{I}_S)),$$

where $\hat{I}_C$ represents the estimated clutter layer, K is the number of ages in the subset of images, $I_i$ is a member of the subset of images, $T_i^C$ represents the clutter motion, $\hat{I}_S$ represents the stent layer estimated in a previous iteration, and $T_i^S$ represents the stent layer motion.

According to a further aspect of the invention, estimating a stent layer comprises calculating $$\hat{I}_S = \frac{1}{K} \sum_{i \in [1,K]} (T_i^S)^{-1}(I_i - T_i^C(\hat{I}_C)),$$

where $\hat{I}_S$ represents the stent layer, $\hat{I}_C$ represents the estimated clutter layer.

According to a further aspect of the invention, minimizing a functional to calculate a refined stent layer image comprises calculating $$I_S = \operatorname*{argmin}_{T_i^S, T_i^C, I_C, I_S} \sum_{i \in [1,K]} \|I_i - T_i^S(I_S) - T_i^C(I_C)\|^2,$$

where $T_i^S$ represents the stent motion.

According to a another aspect of the invention, there is provided a method for enhancing stent visibility in digital medical images, including providing a time series of 2-dimensional (2D) images of a stent in a vessel, where the stent has a pair of balloon markers attached thereto, attempting to detect a 2D location of the balloon markers in each of the images, and selecting a subset of images having as members those images in which the balloon marker locations are detectable, estimating motion of the stent from the 2D balloon marker locations in each image of the subset of images, pre-processing each image in the subset of images to make the image intensities additive, and to compensate for changes in lighting in the images of the subset of images, separating an image layer containing the stent from an image layer containing clutter in each image of the subset of images, where clutter comprises anatomical structures other than the stent, and aligning the stent image layer with an image of the vessel, where the aligned images have enhanced visibility of the stent placement in the vessel.

According to a further aspect of the invention, separating an image layer containing the stent from an image layer containing clutter in each image includes estimating clutter motion in the subset of images, estimating a clutter layer in the subset of images from the estimated clutter motion, estimating a stent layer in the subset of images from the clutter layer and the estimated clutter motion, and repeating the steps of estimating clutter motion, estimating a clutter layer, and estimating a stent layer until the refined stent layer image converges, where the refined stent layer image has enhanced visibility of the stent.

According to a further aspect of the invention, repeating the steps of estimating clutter motion, estimating a clutter layer, and estimating a stent layer minimizes a functional $$\sum_{i \in [1,K]} \|I_i - T_i^S(I_S) - T_i^C(I_C)\|^2,$$

where $I_C$ represents the estimated clutter layer, K is the number of images in the subset of images, $I_i$ is a member of the subset of images, $T_i^C$ represents the clutter motion, $I_S$ represents the stent layer estimated in a previous iteration, and $T_i^S$ represents the stent layer motion, where $\hat{I}_S$ is a stent layer $I_S$ that minimizes the functional.

According to a another aspect of the invention, there is provided a program storage device readable by a computer, tangibly embodying a program of instructions executable by the computer to perform the method steps for enhancing stent visibility in digital medical images.

BRIEF DESCRIPTION OF THE DRAWINGS

FIG. 2 is a flowchart of a method for layer separation, according to an embodiment of the invention.

FIGS. 3(a)-(b) and 4(a)-(b) depict results of stent visibility enhancement experiments comparing an align-and-average method to a method according to an embodiment of the invention.

DETAILED DESCRIPTION OF EXEMPLARY EMBODIMENTS

Figure 1:
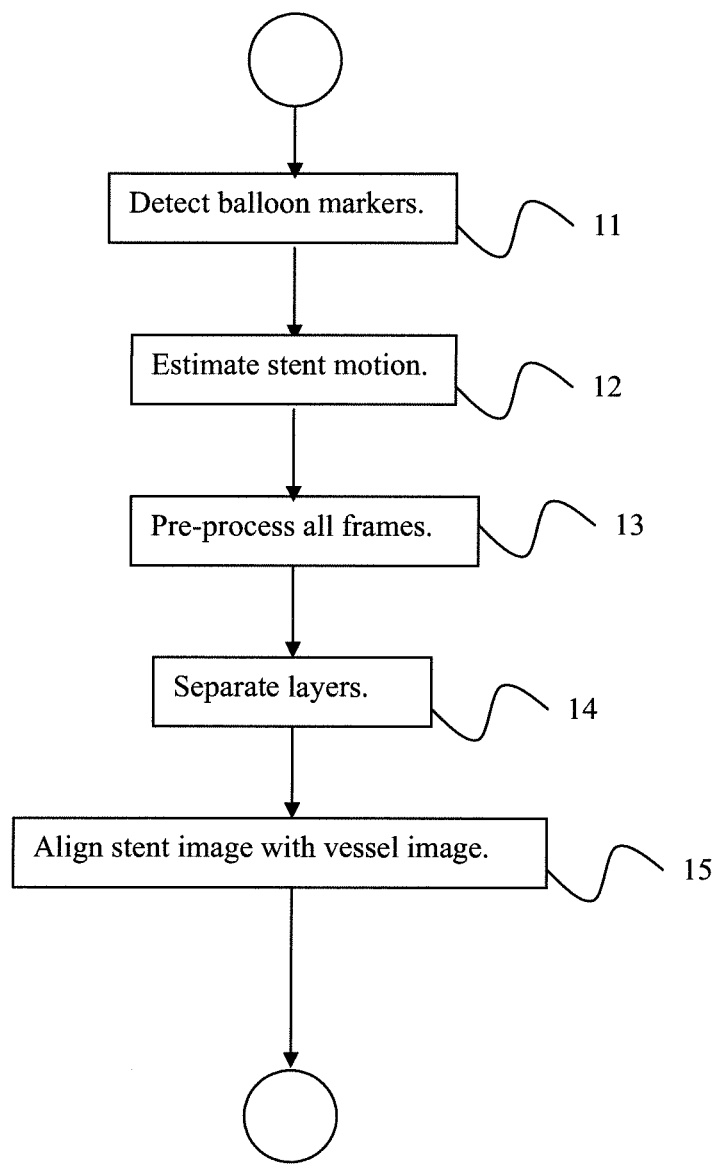
FIG. 1 is a flowchart of a method for enhancing the visibility of stents in digital medical images, according to an embodiment of the invention.

Exemplary embodiments of the invention as described herein generally include systems and methods for to enhancing the visibility of stents in digital medical images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc.

Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Balloon Marker Detection

Balloon markers usually have a circular shape and a range of possible sizes. Hence, a balloon marker can usually be detected by a template matching type of algorithm. But simple template matching usually produces significant false detections as well. It becomes necessary to explicitly verify that a high matching score is really caused by a circular shape instead of some other high contrast structures such as guidewire tips or other intervention tools. Other information, such as a pair of markers that maintain a similar distance or angle can be also helpful. Since balloon marker detection algorithms are known in the art, and an algorithm according to an embodiment of the invention does not depend on any particular implementation of a detection algorithm, only the result, details of the detection part will not be further discussed herein.

A detection algorithm is applied to every image frame of the series of acquired images to detect a pair of balloon markers. In the case that the markers cannot be reliably detected or the markers have moved out of the image, the detection result for that frame is set to zero.

Stent Motion Estimation

For those frames in which the balloon markers can be detected, one can estimate the motion of the stent, i.e., $T_i^S(\ )$. To estimate stent motion, a reference image is selected, usually the first image in a sequence of images for which the balloon markers can be detected. Then, according to an embodiment of the invention, the stent motion is estimated for every other image frame (for which the balloon markers can be detected) with respect to the reference image. Since one has the location of a pair of markers in a 2D space, the motion can be estimated with up to 4 degrees of freedom (DOF), including a 2D translation (2 DOF), rotation (1 DOF) and scaling (1 DOF), and can be represented by a 3×3 aflame transformation matrix that is a product of the translation matrix, rotation matrix, and scaling matrix. It is worth noting that the scaling should not be the traditional isotropic scaling. Instead, it should be a scaling along the long axis of the stent due to the fact that the stent can have out-of-plan rotation or stretching motion. A motion model according to an embodiment of the invention can be calculated as follows.

2D Translation: translation can be calculated from the displacement between the center of the detected marker pairs in the reference frame and a current frame.

Rotation: rotation angle can be calculated from the angle difference between the detected marker pairs in the reference frame and the current frame.

Axial Scaling: Because the stent is actually moving in 3D space, there are several factors that can change the distance between the markers, such as zooming, out-of-plane rotation, and a significant change of depth. According to an embodiment of the invention, it may be assumed that out of plane rotation or stretching are the primary causes for the marker distance to change. Base on this assumption, the scaling should only be applied along the length of the stent while the diameter of the stent should not change.

Pre-Processing

A pre-processing step according to an embodiment of the invention includes two parts. First, a remapping curve is applied to input image intensity to make the image more additive. Second, a lighting compensation procedure is performed to compensate for lighting changes during the acquisition of the series (mostly seen in first several frames in the series).

Since most image processing techniques assume the image to be additive signal, it is necessary to remap the image intensity to assure additive property. If input images are raw intensity images, a log function remapping can achieve this: $I_i'=\log(I_i)$. If input images have already been through some remapping, the remapping function should be readjusted accordingly.

To compensate for changes in lighting, a large neighborhood low-pass filter may be applied to each frame after remapping to estimate the non-stationary lighting condition of that frame and to subtract it: $I_i''I_i'=-F(I_i')$, where F represents the low-pass filter. This way, the brightness of each frame in the series can be comparable. An exemplary, non-limiting low pass filter is based on a neighborhood that is large with respect to the size of an image, for example, a 125×125 pixel neighborhood in a 512×512 pixel image.

Layer Separation

According to the model of EQ. (2), one needs to estimate the stent layer $I_S$, the clutter layer $I_C$ and their motion $T_i^S(\ )$ and $T_i^C(\ )$ on every observed images jointly. According to an embodiment of the invention, this estimation can be formulated as an energy optimization problem as follows:

$$\hat{I}_S = \underset{T_i^S, T_i^C, I_C, I_S}{\operatorname{argmin}} \sum_{i \in [1,K]} \|I_i - T_i^S(I_S) - T_i^C(I_C)\|^2. \qquad (3)$$

According to an embodiment of the invention, assuming one can obtain an estimation of the stent motion $T_i^S(\ )$, clutter motion $T_i^C(\ )$ and the appearance of the stent and clutter layers, i.e., $I_S$ and $I_C$, one should be able to predict how each acquired frame looks except for the imaging noise. Assuming the imaging noise is zero-mean independent Gaussian distributed noise, one can derive the optimization objective function as shown in EQ. (3).

This objective function can be solved by iterative optimization steps. As one approaches the true solution, one can predict each frame more accurately and the error term is minimized. FIG. 2 is a flowchart of a method according to an embodiment of the invention for separating the stent and clutter layers. Referring now to the figure, a method begins at step 20 by providing a sequence of images. As described above, the enhancement is estimated based on the whole image sequence to generate one enhanced image of the stent. Next, at step 21 the stent motion is estimated. However, since the stent motion $T_i^S(\ )$ can be estimated based on balloon markers as described above, there is no need to re-estimate the stent motion during the optimization, and the previously estimated stent motion results may be used instead.

At step 22, the clutter layer motion is estimated. However, because the stent usually has a very weak contrast, its presence does not dramatically affect the clutter layer motion estimation. Hence, one can initially estimate the clutter layer motion $T_i^C(\ )$ based on the input series of images directly. For subsequent steps in the iteration, the clutter layer motion may be estimated by subtracting the stent structure from the input image. Observing that (1) $I_i = I_{C,i} + I_{S,i}$, i.e. the observed image=clutter layer+stent layer, (2) $I_{C,i} = T_i^C(I_C)$, i.e., the clutter layer at time i is represented as clutter layer deformed by $T_i^C$, and (3) $I_{S,i} = T_i^S(I_S)$, i.e., the stent layer at time i is represented as stent layer $I_S$ deformed by its motion $T_i^S$, one can estimate $T_i^C$ at subsequent iterations by combining the $I_S$ estimation from the stent layer estimation with the estimated stent layer motion to remove $I_{S,i}$ from I, leaving only the $I_{C,i}$ term. From this, one can obtain a more accurate estimation of the clutter layer motion in successive iterations.

At step 23, the clutter layer is estimated. Once the clutter layer motion estimated, the clutter layer can be estimated as follows:

$$\hat{I}_C = \frac{1}{K} \sum_{i \in [1,K]} (T_i^C)^{-1}(I_i - T_i^S(\hat{I}_S)).$$

Since the stent layer is unknown, one can use the estimated stent image in a previous iteration to be subtracted from each observed image. In the first iteration, one can assume the stent layer to be all zero.

At step 24, the stent layer is estimated, based on the estimation of the clutter layer and its motion:

$$\hat{I}_S = \frac{1}{K} \sum_{i \in [1,K]} (T_i^S)^{-1}(I_i - T_i^C(\hat{I}_C)).$$

In step 25, it is determined if it is necessary to further refine the estimation of $T_i^C(\ )$, $\hat{I}_C$ and $\hat{I}_S$. If current iteration does not significantly change these estimations, or the update is not further reducing the objective function of EQ. (3), or the number of iteration has reached a preset threshold, the iterations can be stopped and the $\hat{I}_S$ can be presented as the final result. By iterating steps 22, 23, 24, one gradually optimizes the objective function of EQ. (3).

With explicit modeling of the clutter layer, one can separate the clutter layer from the stent image $\hat{I}_S$ and hence obtain a cleaner stent image than traditional averaging method.

Align Stent/Vessel Images

After the enhanced stent image has been obtained, it can be aligned at step 26 to a contrast image which highlights the vessel tree. Displaying these two aligned images (stent image and vessel image) together allows a better visualization of the stent placement.

The alignment is performed based on the balloon markers on both stent image and vessel image as well. The motion model is the same as previously described above. With the two aligned images, there are different options to visualize the two images. One choice would be to invert the intensity of one image and perform a fade in/out animation between the two aligned images.

Experimental Results

An algorithm according to an embodiment of the invention was applied to more than 30 clinical sequences and promising results were obtained. Comparisons were performed against align-and-average methods to see the changes with respect to a method according to an embodiment of the invention.

The first sequence has rather good signal to noise ratio, with about 50 frames in the sequence. FIG. 3(a) shows that a traditional averaging method can only blur the clutter layer, instead of removing it. The clutter structures disturb the stent visibility. Thanks to the good signal to noise ratio, the stent can still be seen in averaging result. On the other hand, a layer separation method according to an embodiment of the invention can successfully remove the unrelated clutter layer and improve the visibility of the stent, as shown in FIG. 3(b).

In the second sequence, the stent has very low signal to noise ratio. FIG. 4(a) shows that the stent is barely visible after averaging over 30 frames in the sequence. As shown in FIG. 4(b), a layer separation method according to an embodiment of the invention can successfully remove the unrelated clutter layer and enhance the visibility dramatically based on the same number of frames.

These experiments show that an algorithm according to an embodiment of the invention is robust to very low signal-to-noise ratio and can work in widely different imaging settings. A layer separation algorithm according to an embodiment of the invention can successfully remove unrelated clutter and dramatically enhance the stent visibility.

System Implementation

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
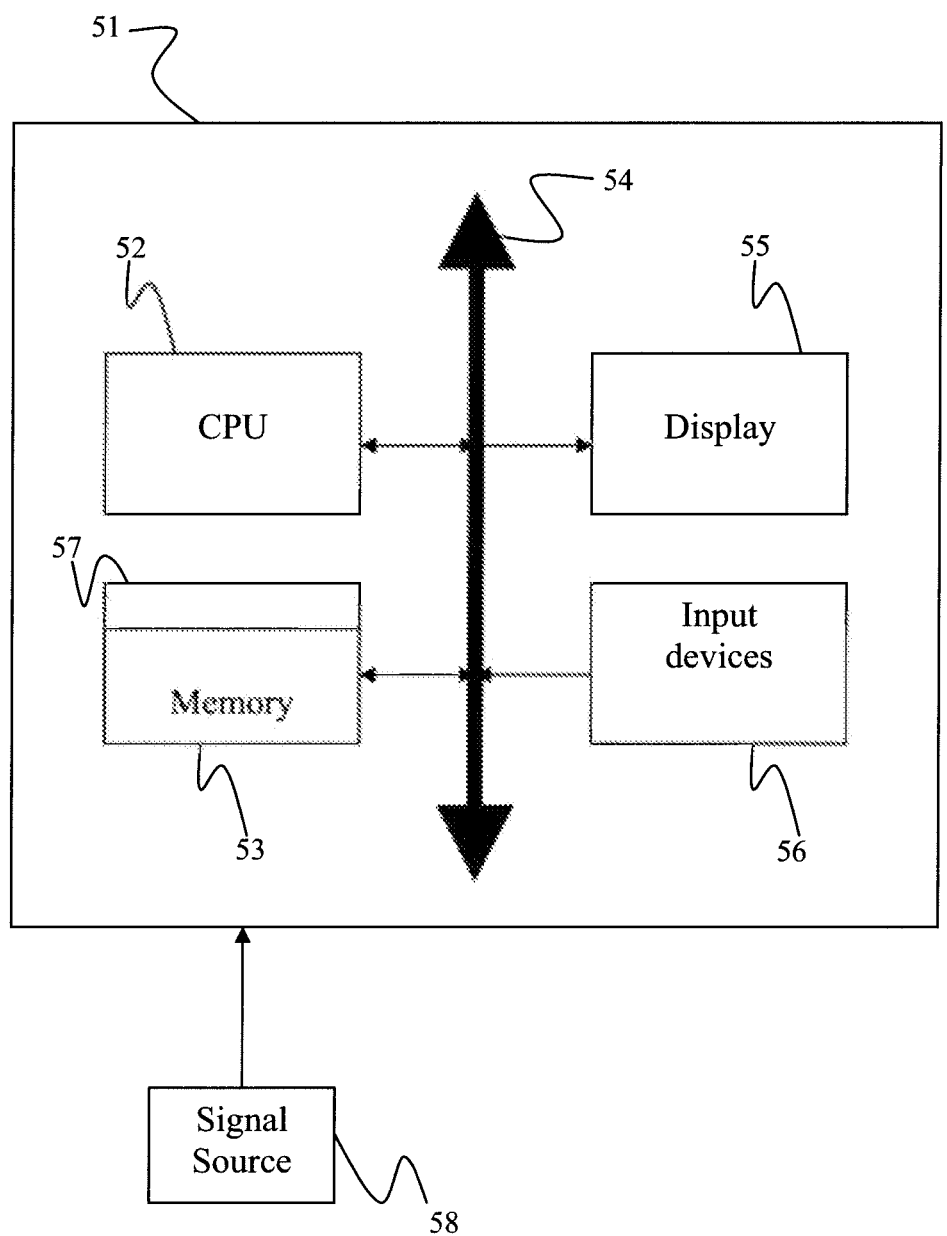
FIG. 5 is a block diagram of an exemplary computer system for implementing a method for enhancing the visibility of stents in digital medical images, according to an embodiment of the invention.

FIG. 5 is a block diagram of an exemplary computer system for implementing a method for multi-image based stent visibility enhancement according to an embodiment of the invention. Referring now to FIG. 5, a computer system 51 for implementing the present invention can comprise, inter cilia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for enhancing stent visibility in digital medical images, comprising the steps of:
- receiving a time series of 2-dimensional (2D) images of a stent in a vessel;
- estimating motion of the stent in a subset of images of the time series of images;
- estimating motion of clutter in the subset of images, wherein clutter comprises anatomical structures other than the stent;
- estimating a clutter layer in the subset of images from the estimated clutter motion;
- estimating a stent layer in the subset of images from the clutter layer and the estimated clutter motion; and
- minimizing a functional $$\sum_{i \in [1,K]} \|I_i - T_i^S(I_S) - T_i^C(I_C)\|^2,$$

of the estimated stent motion, the estimated stent layer, the estimated clutter motion, and the estimated clutter layer to calculate a refined stent layer image, wherein K is the number of images in the subset of images, wherein K is the number of images in the subset of images, $I_i$ is a member of the subset of images, $I_S$ represents the stent layer estimated in a previous iteration, and $T_i^S$ represents the estimated stent layer motion, $I_C$ represents the estimated clutter layer, $T_i^C$ represents the estimated clutter motion,
wherein said refined stent layer image has enhanced visibility of the stent,
wherein the steps of receiving a time series of 2D images, estimating motion of the stent, estimating motion of clutter, estimating a clutter layer, estimating a stent layer, and minimizing a functional are performed by a computer processor.

2. The method of claim 1, further comprising aligning said refined stent layer image with an image of said vessel.

3. The method of claim 1, wherein said stent has a pair of balloon markers attached thereto, and further comprising attempting to detect a 2D location of said balloon markers in each of said images, wherein the subset of images has as members those images in which the balloon marker locations are detectable.

4. The method of claim 3, wherein estimating stent motion comprises selecting a first image of the subset of images as a reference image, and for each remaining image in the subset of images, using the 2D balloon marker locations to calculate a 2D translation of a current image with respect to the reference image, a rotation angle from an angle difference of the 2D balloon marker locations in the current image with respect to the reference image, and an axial scaling of the stent in the current image with respect to the reference image, and calculating the stent motion from said translation, rotation, and scaling.

5. The method of claim 1, further comprising pre-processing each image in the subset of images to make the image intensities additive, and to compensate for changes in lighting in the images of the subset of images.

6. The method of claim 1, wherein clutter motion is initialized to zero.

7. The method of claim 1, wherein minimizing said functional of the estimated stent motion, the estimated stent layer, the estimated clutter motion, and the estimated clutter layer comprises repeating said steps of estimating clutter motion, estimating a clutter layer, estimating a stent layer, and minimizing a functional until the refined stent layer image converges.

8. The method of claim 7, wherein clutter motion is estimated by subtracting the refined stent layer image from each image in the subset of images to obtain an estimated clutter layer corresponding to each image in the subset of images, and estimating clutter motion from differences in the clutter images.

9. The method of claim 1, wherein estimating a clutter layer comprises calculating $$\hat{I}_C = \frac{1}{K} \sum_{i \in [1,K]} (T_i^C)^{-1}(I_i - T_i^S(\hat{I}_S)),$$

wherein $\hat{I}_C$ represents the estimated clutter layer, and $\hat{I}_S$ represents the stent layer estimated in a previous iteration.

10. The method of claim 9, wherein estimating a stent layer comprises calculating $$\hat{I}_S = \frac{1}{K} \sum_{i \in [1,K]} (T_i^S)^{-1}(I_i - T_i^C(\hat{I}_C)).$$

11. A method for enhancing stent visibility in digital medical images, comprising the steps of:
- receiving a time series of 2-dimensional (2D) images of a stent in a vessel, wherein said stent has a pair of balloon markers attached thereto;
- attempting to detect a 2D location of said balloon markers in each of said images, and selecting a subset of images having as members those images in which the balloon marker locations are detectable;
- estimating motion of the stent from the 2D balloon marker locations in each image of the subset of images;
- pre-processing each image in the subset of images to make the image intensities additive, and to compensate for changes in lighting in the images of the subset of images;
- separating an image layer containing said stent from an image layer containing clutter in each image of said subset of images by minimizing a functional $$\sum_{i \in [1,K]} \|I_i - T_i^S(I_S) - T_i^C(I_C)\|^2,$$

wherein K is the number of images in the subset of images, $I_i$ is a member of the subset of images, $I_S$ is represents a stent layer estimated in a previous iteration, and $T_i^S$ represents an estimated stent layer motion, $I_C$ represents an estimated clutter layer, $T_i^C$ represents an estimated clutter motion, wherein clutter comprises anatomical structures other than the stent; and aligning said stent image layer with an image of said vessel, wherein said aligned images have enhanced visibility of the stent placement in the vessel, wherein the steps of receiving a time series of 2D images, attempting to detect a 2D location, estimating motion of the stent, pre-processing each image, separating an image layer, and aligning said stent image layer are performed by a computer processor.

12. The method of claim 11, wherein separating an image layer containing said stent from an image layer containing clutter in each image comprises:
   estimating clutter motion in the subset of images;
   estimating a clutter layer in the subset of images from the estimated clutter motion;
   estimating a stent layer in the subset of images from the clutter layer and the estimated clutter motion; and
   repeating said steps of estimating clutter motion, estimating a clutter layer, and estimating a stent layer until the refined stent layer image converges, wherein said refined stent layer image has enhanced visibility of the stent.

13. A program storage device readable by a computer, tangibly embodying a program of instructions executable by the computer to perform the method steps for enhancing stent visibility in digital medical images, comprising the steps of:
   providing a time series of 2-dimensional (2D) images of a stent in a vessel;
   estimating motion of the stent in a subset of images of the time series of images;
   estimating motion of clutter in the subset of images, wherein clutter comprises anatomical structures other than the stent;
   estimating a clutter layer in the subset of images from the estimated clutter motion;
   estimating a stent layer in the subset of images from the clutter layer and the estimated clutter motion; and
   minimizing a functional $$\sum_{i\in[1,K]} \|I_i - T_i^S(I_S) - T_i^C(I_C)\|^2$$

of the estimated stent motion, the estimated stent layer, the estimated clutter motion, and the estimated clutter layer to calculate a refined stent layer image, wherein K is the number of images in the subset of images, $I_i$ is a member of the subset of images, $I_s$ represents the stent layer estimated in a previous iteration, and $T_i^S$ represents the estimated stent layer motion, $I_C$ represents the estimated clutter layer, $T_i^C$ represents the estimated clutter motion, wherein said refined stent layer image has enhanced visibility of the stent.

14. The computer readable program storage device of claim 13, the method further comprising aligning said refined stent layer image with an image of said vessel.

15. The computer readable program storage device of claim 13, wherein said stent has a pair of balloon markers attached thereto, and further comprising attempting to detect a 2D location of said balloon markers in each of said images, wherein the subset of images has as members those images in which the balloon marker locations are detectable.

16. The computer readable program storage device of claim 15, wherein estimating stent motion comprises selecting a first image of the subset of images as a reference image, and for each remaining image in the subset of images, using the 2D balloon marker locations to calculate a 2D translation of a current image with respect to the reference image, a rotation angle from an angle difference of the 2D balloon marker locations in the current image with respect to the reference image, and an axial scaling of the stent in the current image with respect to the reference image, and calculating the stent motion from said translation, rotation, and scaling.

17. The computer readable program storage device of claim 13, the method further comprising pre-processing each image in the subset of images to make the image intensities additive, and to compensate for changes in lighting in the images of the subset of images.

18. The computer readable program storage device of claim 13, wherein clutter motion is initialized to zero.

19. The computer readable program storage device of claim 13, wherein minimizing said functional of the estimated stent motion, the estimated stent layer, the estimated clutter motion, and the estimated clutter layer comprises repeating said steps of estimating clutter motion, estimating a clutter layer, estimating a stent layer, and minimizing a functional until the refined stent layer image converges.

20. The computer readable program storage device of claim 19, wherein clutter motion is estimated by subtracting the refined stent layer image from each image in the subset of images to obtain an estimated clutter layer corresponding to each image in the subset of images, and estimating clutter motion from differences in the clutter images.

21. The computer readable program storage device of claim 13, wherein estimating a clutter layer comprises calculating $$\hat{I}_C = \frac{1}{K}\sum_{i\in[1,K]} (T_i^C)^{-1}(I_i - T_i^S(\hat{I}_S)),$$

wherein $\hat{I}_C$ represents the estimated clutter layer, and $\hat{I}_S$ represents the stent layer estimated in a previous iteration.

22. The computer readable program storage device of claim 21, wherein estimating a stent layer comprises calculating $$\hat{I}_S = \frac{1}{K}\sum_{i\in[1,K]} (T_i^S)^{-1}(I_i - T_i^C(\hat{I}_C)).$$

* * * * *